April 17, 1962 P. A. MANOR 3,030,067
VALVES
Filed June 22, 1959 3 Sheets-Sheet 1
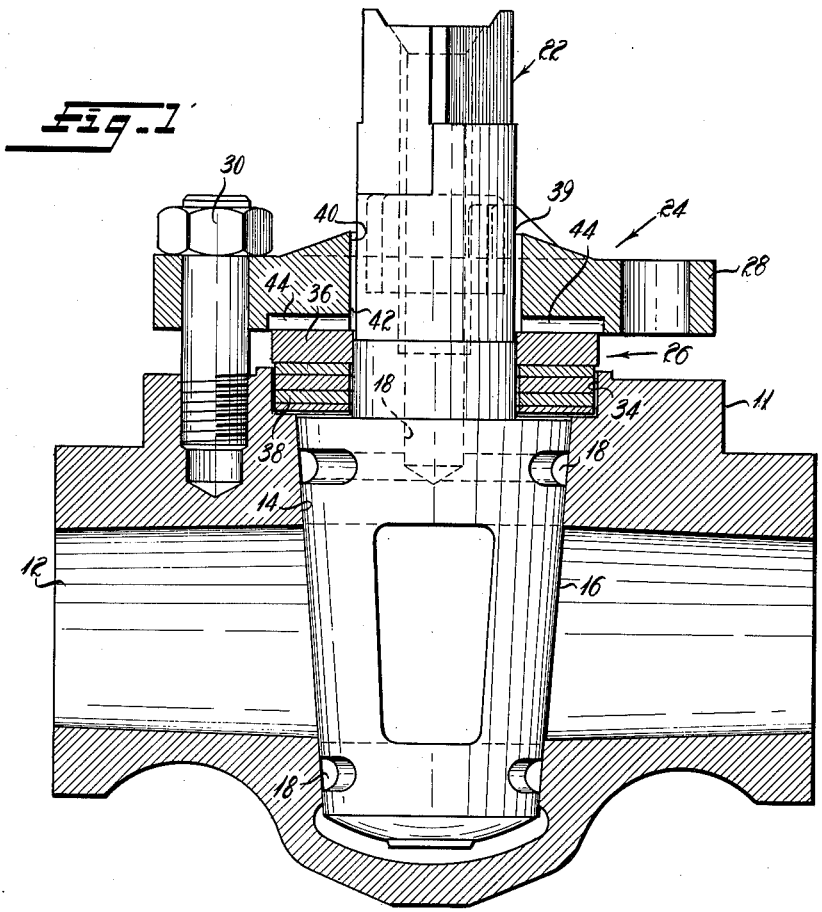
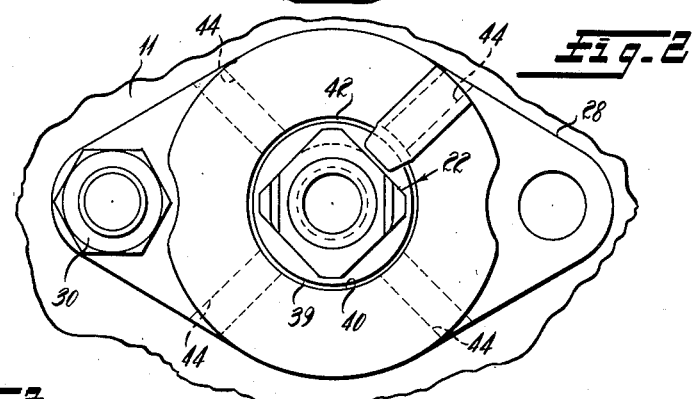
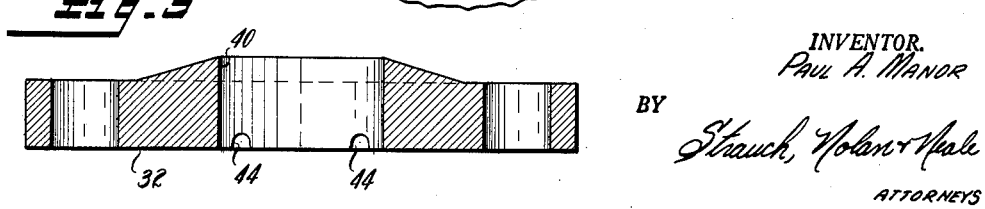
INVENTOR.
PAUL A. MANOR
BY
Strauch, Nolan & Neale
ATTORNEYS April 17, 1962 P. A. MANOR 3,030,067
VALVES
Filed June 22, 1959 3 Sheets-Sheet 2
INVENTOR.
PAUL A. MANOR
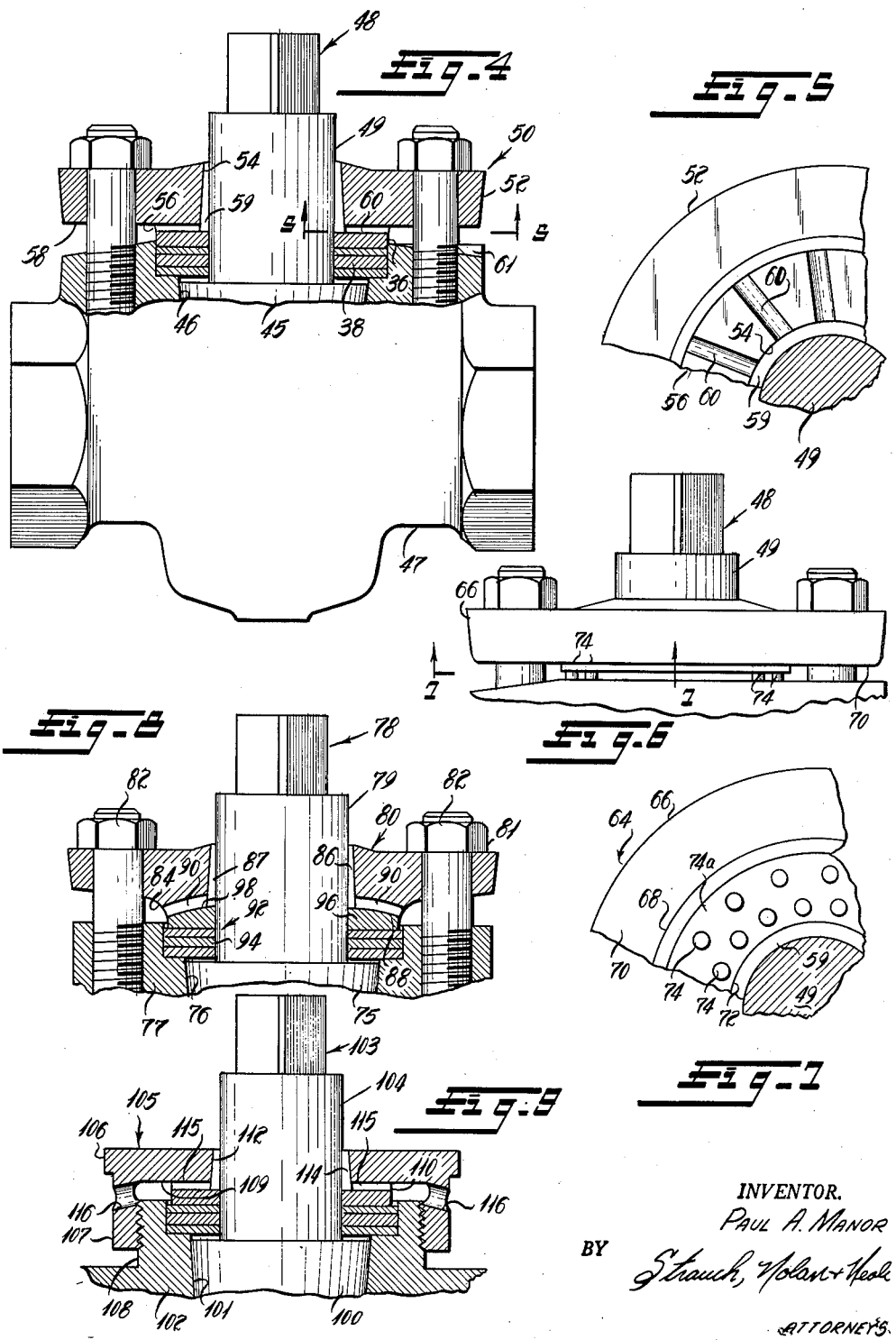

April 17, 1962 P. A. MANOR 3,030,067
VALVES
Filed June 22, 1959 3 Sheets-Sheet 3

INVENTOR.
PAUL A. MANOR
Strauch, Nolan + Neale
ATTORNEYS

United States Patent Office 3,030,067
Patented Apr. 17, 1962

3,030,067
VALVES
Paul A. Manor, Pittsburgh, Pa., assignor to Rockwell Manufacturing Company, Pittsburgh, Pa., a corporation of Pennsylvania
Filed June 22, 1959, Ser. No. 821,915
7 Claims. (Cl. 251—214)

The present invention relates to valves and more particularly to plug valves which accumulate water, moisture and foreign matter in the clearance gap formed between the operating stem and the valve body cover.

This application is a continuation-in-part of copending application Serial No. 663,175, filed June 3, 1957, jointly with Charles V. Staller and Paul A. Manor.

In the manufacture of plug valve assemblies, extreme accuracy of the fit between the valve body cover and the valve operating stem as it projects through the cover is not essential to normally facilitate valve operation. Consequently, it is generally common and accepted practice in the manufacture of the valve stem and the valve body cover to provide for an extremely large clearance between the two parts so that in assembled relationship a loose fit with considerable freedom is established. This serves to facilitate ready assembly of the parts and reduces manufacturing costs by eliminating the necessity for maintaining accurate and close tolerances.

To further reduce manufacturing costs, the valve body covers are generally cast with a centrally located aperture for the valve stem. The casting of parts, it will be appreciated, contributes greatly to wide and inaccurate tolerances and consequently the clearance that is provided between the cover and the stem must be made sufficiently large to accommodate these great variations in tolerances that are produced from the casting operation. Thus, it will be appreciated from the foregoing that a gap or clearance af appreciable magnitude is generally formed between the valve body cover and the valve stem and which is open at the top and closed at the bottom by the valve stem packing to form a well or reservoir.

When these valves are placed in service in the field the clearance space between the cover and stem tends to collect and accumulate rain, water, moisture, dirt, grit and sand. The accumulation of moisture and water causes eventual corrosion of the stem and cover while the accumulation of the entrapped sand, dust, dirt and grit tends to grind into the stem to thereby cause further damage to the stem when it is rotated.

The advantages derived from the elimination of the gap by increasing the accuracy of the fit do not economically justify the inordinate increase in the cost of manufacture resulting from producing the parts with highly accurate and close tolerances. Similarly, the expense in providing for hoods to seal off the open end of the gap is not entirely offset by the advantages that are obtained therefrom, which include more dependable operation and a prolonged life of the valve.

The present invention contemplates an economically useful and novel drainage system for the gap between the valve cover and the valve operating stem. In accordance with the present invention, this drainage system generally comprises drainage passageways communicating with the base of the clearance space and leading to the outside of the valve body to drain off the moisture and grit that collects in the gap to establish a substantially dry condition and to thereby prevent corrosion or other damage to the cover and the stem.

Accordingly, wih the foregoing purposes and considerations in mind, it is the major object of this invention to provide a novel valve assembly having a drainage system to assure and facilitate ready removal of accumulations of water, moisture and foreign particles from the clearance gap formed between the valve cover and the valve operating stem of the assembly.

A further object of the invention is to provide a plug valve assembly wherein the valve body closure members are formed with drainage passageways for draining accumulations of water together with grit and dirt from the clearance space formed between the valve cover plate and the valve operating stem.

Another object of the invention is to provide a plug valve assembly with a valve body cover formed with drainage grooves to facilitate the removal of water together with grit and dirt from the clearance space formed between the cover and the valve stem of the assembly.

Further objects of the invention will appear as the description proceeds in connection with the accompanying drawings in which:

FIGURE 1 is a view in section showing a plug valve assembly according to a preferred embodiment of the invention;

FIGURE 2 is a top plan view of the embodiment of FIGURE 1;

FIGURE 3 is a section of the valve body cover illustrated in FIGURES 1 and 2;

FIGURE 4 is a view partly in elevation and partly in section showing a plug valve assembly according to another embodiment of the invention;

FIGURE 5 is a fragmentary section taken substantially along the line 5—5 of FIGURE 4;

FIGURE 6 is a fragmentary elevation showing a plug valve assembly according to another embodiment of the invention;

FIGURE 7 is a fragmentary section similar to the section of FIGURE 5 and taken along the line 7—7 of FIGURE 6;

FIGURE 8 is a fragmentary section of a plug valve assembly showing a further embodiment of the invention;

FIGURE 9 is a fragmentary section of a plug valve assembly showing still another embodiment of the invention;

Figure 10:
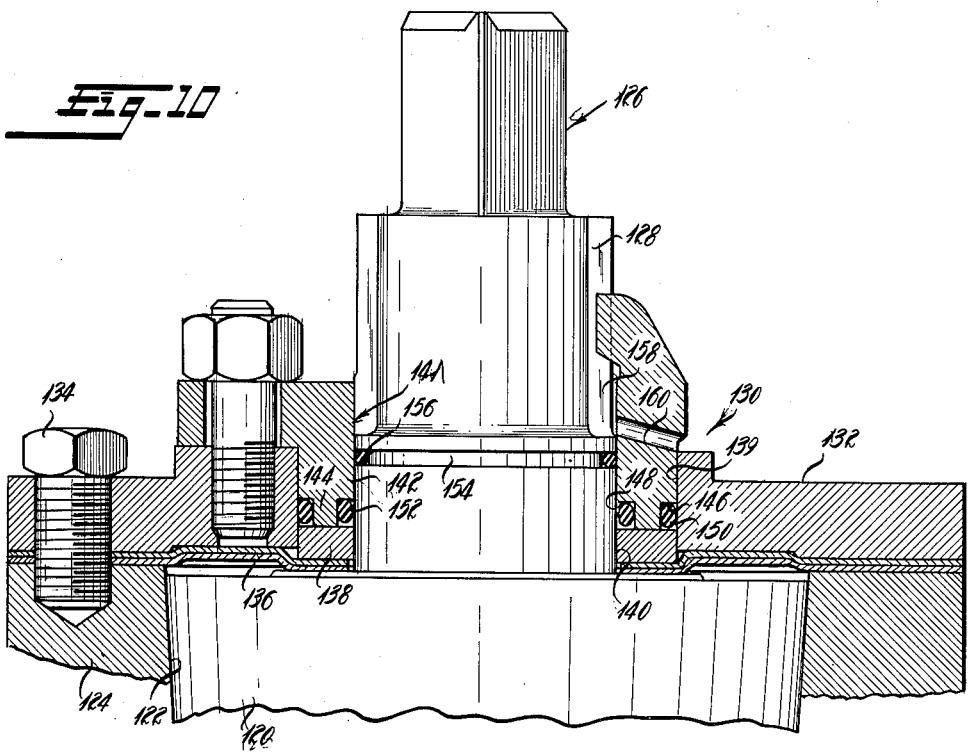
FIGURE 10 is a fragmentary section showing a plug valve assembly according to still another embodiment of the invention.

Referring now to the drawings and more particularly to FIGURES 1–3, wherein one construction embodying the principles of the present invention is shown, the reference numeral 11 generally designates a plug valve body formed with an axial through passage 12 intersected at right angles by a tapered valve seat bore 14 that is open at the upper end. Rotatably seated on the conical surfaces provided by the bore 14 is a tapered valve plug 16 having a diametral through port 17 shown in its closed position in FIGURE 1 and which is adapted when rotated 90° to a position to form a continuation of passageway 12. The plug 16 is provided with the usual lubrication distributing surface grooves 18 to which lubricant is supplied in a conventional manner as through a passage 20 in the valve operating stem 22 but this lubrication distribution feature does not constitute a part of the present invenion.

In this embodiment, the top of bore 14 is closed by a valve closure assembly 24 having a stem packing assembly 26 and a valve cover 28 which is rigidly secured to body 11 over the top of bore 14 as by stud and nut assemblies 30. The stem packing assembly 26 is clamped tightly between the bottom face 32 of cover 28 and an annular shouldered recess 34 provided in the top of the valve body 11 coaxially surrounding the upper edge of the bore 14. This packing assembly 26 comprises a rigid flat-sided annular thrust washer 36 pressed by the cover 28 against the upper face of a standard compressible annular stem packing 38 such as asbestos so as to seat the packing in the recess 34 in surrounding relation to the valve stem 22 substantially at its juncture with the plug 16. The valve stem 22 is rigid with the plug 16 and is provided with a cylindrical section 39 which projects upwardly through an aperture 40 centrally formed in the cover 28.

In accordance with the present invention, the cover 28 generally is cast with aperture 40 so that a sufficiently large clearance is provided between the cover and the stem 22 to accommodate the wide variation in working tolerance limits encountered in producing castings and to further provide an extremely loose fit for facilitating ready assembly or removal of the cover from the valve assembly. The clearance thus provided leaves a space or gap 42 between the cover 28 and the stem 22 which is open at the top and closed at the bottom by the stem packing assembly 26.

Thus a well is formed by the clearance space 42 which tends to accumulate moisture, water, grit, dirt, etc. when the valve is placed in service in the field. In order to remove the collection of moisture and grit from the clearance space and thereby to prevent corrosion and damage to the valve stem, the cover 28 is formed with a plurality of conveniently spaced radially extending drainage grooves 44 recessed into the flat bottom cover face 32 (FIGURE 3) which is coplanar with a plane extending transversely of the stem axis. The inner ends of grooves 44 open into and intersect the bottom portion of the clearance space 42 while the outer ends of these grooves terminate at the peripheral edge of the cover 28 so as to form uniform unobstructed drainage passageways with the top planar face of thrust washer 36 which extends from the clearance space 42 to the outside of valve body 11.

By this construction, it will be appreciated that accumulations of water and moisture together with grit in the clearance space 42 are steadily and continuously drained off through the drain passages 44 to the outside of body 11 thereby leaving the space substantially dry and free of foreign particles. In this manner corrosion of the stem 22 in the region of cover 28 and damage to the stem by the abrasive action caused by collections of sand and grit is substantially eliminated without necessitating expensive machining and close-fit working limits to close up the clearance space.

FIGURES 4 and 5 illustrate a further embodiment of the present invention wherein a valve plug 45 rotatable in a tapered bore 46 of body 47 has a rigid operating stem 48 with a cylindrical section 49 surrounded by a valve body closure assembly 50. The valve body closure assembly 50 includes a valve body cover 52 which is formed with a centrally located stem bore 54 and an annular boss 56 projecting downwardly from the planar bottom face 58 of the cover in concentric relation to bore 54. The cover 52 surrounds the stem cylindrical section 49 in spaced relation and defines a clearance space 59. The boss 56 abuts the top planar face of thrust washer 36 of the packing assembly 26 described in connection with the embodiment of FIGURE 1 and which forms a part of the closure assembly. Boss 56 is provided with a plurality of conveniently spaced radially extending channels 60 recessed into its depending end face which abuts the washer 36.

By this structure, uniform radially extending unobstructed drainage passages are formed which intersect at their inner ends with the clearance space 59 defined by the cover 52 and the stem 48 and are open at their outer ends to the outside of the valve body 47. The top face of the body 47 is provided with radially extending downwardly sloping drainage grooves 61 to carry away the water drained through the groove passages 60. Thus, drainage of water and moisture together with grit and dirt from the clearance space is thereby facilitated.

FIGURES 6 and 7 illustrate a variation of the invention wherein a closure assembly 64 comprises a cover 66 formed integrally with a boss 68 projecting downwardly from the planar bottom face 70 of the cover in concentric relation to the centrally located stem bore 72. This boss is provided with a plurality of uniform spaced apart stud-like projections 74 which extend to abut the thrust washer 36 of packing assembly 30 in assembled relationship.

By this construction, it will be appreciated that the stud-like projections 74 maintain the bottom face of the boss 68 in spaced relationship to the top face of thrust washer 36 to thereby form a plurality of unobstructed drainage passages indicated at 74a, which interconnect the clearance space 59 with the outside of the valve body 47.

The projections 74 as well as the grooves 60 may be provided at the faces of either the valve body cover 52 or the seal thrust washer 36 and may be formed with the casting of these parts.

FIGURE 8 illustrates a further embodiment wherein a valve plug 75 rotatable in a tapered bore 76 of body 77 has a rigid operating stem 78 with a cylindrical section 79 surrounded by a valve body closure assembly 80. This closure assembly 80 comprises a valve body cover 81 rigidly fastened to the body 77 as by stud and nut assemblies 82 and having an annular boss 84 projecting downwardly from the bottom face thereof in conventric relationship to a centrally located stem bore 86. The cover 81 surrounds the stem cylindrical section 79 in spaced relation to define a clearance space or gap 87.

The boss 84 is provided with a concave spherically shaped face 88 into which conveniently spaced unobstructed radially extending grooves 90 of uniform depth are recessed. Clamped tightly between the cover 81 and the valve body 77 is a valve stem sealing assembly 92 which includes the conventional annular compressible asbestos type packing 94 and a rigid annular thrust washer 96 overlying the packing 94. The thrust washer 96 is formed with an upper spherically shaped convex face 98 which corresponds to the concave face 88 of cover boss 84. These spherically shaped faces provide for a more efficient transmission of sealing pressure that is applied to the packing 94 by the cover 81.

By this structure it will be appreciated that the grooves 90 in cover 81 form radially extending downwardly curved uniform unobstructed passages with the thrust washer 96 which intersect the clearance space 87 at their inner ends and extend to the outside of valve body 77. Thus, drainage of the clearance space 87 is facilitated and the downward slope of the drainage passages improves the removal of water and grit from the space.

FIGURE 9 illustrates another embodiment wherein a valve plug 100 rotatable in a tapered bore 101 of body 102 has a rigid operating stem 103 with a cylindrical section 104 surrounded by a body closure assembly 105. The valve body closure assembly 105 includes a valve body cap nut 106 which has a downwardly depending internally threaded annular skirt 107. This cap nut 106 overlies the valve body bore 101 in surrounding spaced relation to the valve stem 103 and threadedly engages an externally threaded annular boss 108 integrally formed with the valve body 102. Spaced inwardly from the skirt 107 and projecting downwardly from the bottom face 109 of the nut 106 is an annular boss 110 which surrounds the centrally located bore 112 in the nut. The valve stem 103 projects through the bore 112 in spaced relation to the nut to define the clearance space 114.

Clamped tightly between the bottom face of the boss 110 and the valve body 102 is the valve stem seal assembly 30 hereinbefore described. In order to provide for the drainage of the clearance space 114, the cap nut boss 110 is formed with conveniently spaced radially extending grooves 115 which form uniform unobstructed drainage passages with the thrust washer 36 of the seal assembly 30. The cap nut skirt 107 is formed with conveniently spaced radially extending downwardly sloped through passages 116 for facilitating the removal of water and dirt from the space formed between the cap nut 106 and the valve body boss 108.

Figure 11:
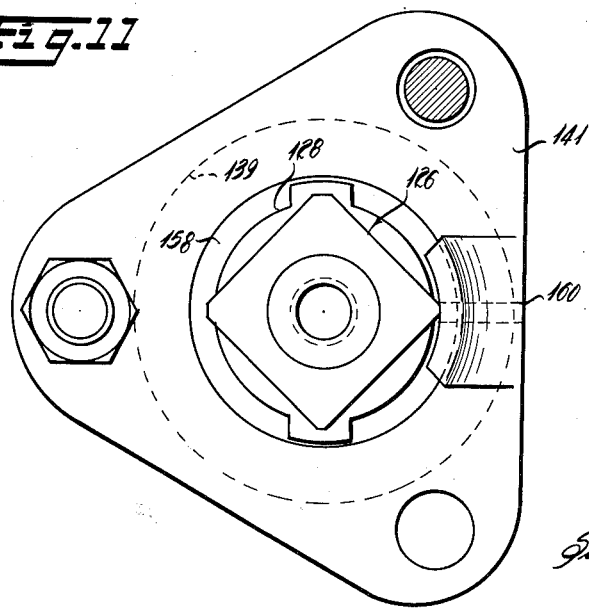
FIGURE 11 is a top plan view of the FIGURE 10 assembly.

FIGURES 10 and 11 illustrate a further embodiment wherein a valve plug 120 rotatable in a tapered bore 122 of body 124 has a rigid operating stem 126 with a cylindrical section 128 surrounded by a valve body closure assembly 130. This closure assembly 130 encloses the open end of the valve bore 122 and comprises a cover 132 secured to the body as by bolts 134. The outer periphery of a laminated flexible steel and compressible material diaphragm 136 is clamped between the cover 132 and the body 124.

A rigid flat-sided metal ring 138 is seated overlying the inner periphery of the diaphragm with a vertical sliding fit in the space between the centrally located cover bore 139 and the stem section 140. A gland 141 rigidly secured to cover 132 has an annular skirt 142 extending slidably into the space between the bore 139 and stem section 140, and at its lower end is formed with an integrally centrally located depending leg 144 that extends down to contact ring 138 and defines annular sealing spaces 146 and 148 in which are disposed resiliently deformable material O-rings 150 and 152. An annular groove is provided in the valve stem section 140 at 154 to seat a deformable sealing ring 156 of synthetic rubber, nylon, "Teflon," or the like. This stem seal feature which includes O-rings 150 and 152, however, does not constitute a part of the present invention.

In the embodiment of FIGURE 10, and in accordance with the present invention, the stem section 128 projects through the gland 141 in spaced relation thereto and defines a clearance space 158. In order to drain off accumulations of water and grit from the space 158, the gland 141 is formed with at least one radially extending downwardly sloped through passage 160 near the bottom of the space. This passage 160 opens to the outside of the valve body 124 to thereby facilitate the drainage of the clearance space.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a plug valve assembly, a body having a through passage for fluid flow and a plug seat formed in said passage, a ported valve plug rotatably mounted in said plug seat, a stem projecting upwardly through an opening in said body for operating said plug; leak proof closure means for said opening and surrounding said stem adjacent said opening, said closure means comprising a packing and a thrust washer overlying said packing in bearing relation thereto and having a top spherically formed convex face; an apertured cover for freely receiving said stem to form a clearance space therewith and having a boss projecting downwardly from the bottom face thereof in surrounding relation to said stem; said boss having a bottom spherically formed concave face corresponding to and in bearing relation to said convex face of said washer; means securing said cover to said body and clamping said closure means in place between said cover and said body; said boss having a plurality of uniform unobstructed grooves recessed into the bottom face thereof and extending radially from the aperture of said cover to a point beyond said packing to form downwardly sloped passageways with said washer for freely draining moisture and foreign matter entering said clearance space away from said stem.

2. In a plug valve assembly, a body having a through passage for fluid flow and a plug seat formed in said passage, a ported valve plug rotatably mounted in said plug seat, a stem projecting upwardly through a valve stem opening in said body for operating said plug, a cover for said valve stem opening and having an opening therethrough for said valve stem, a packing gland rigidly secured to said cover and extending partially into the opening of said cover between said cover and said valve stem; said stem projecting upwardly through said gland in partially spaced relation thereto to define an exposed clearance space therewith, said gland having at last one passage therethrough communicating with the lower portion of said clearance space and extending to the outside of said gland for freely draining moisture and foreign matter entering said clearance spaced away from said stem.

3. In a plug valve assembly, a body having a through passage for fluid flow and a plug seat formed in said passage; a ported valve plug rotatably mounted in said valve seat; a stem projecting upwardly through an opening in said body for operating said plug; leak-proof closure means including a packing for said opening and surrounding said stem within said opening; an apertured cap nut for freely receiving said stem to form a clearance space therewith and having a boss projecting downwardly from the bottom face thereof in surrounding relationship to said stem; a depending threaded annular skirt formed rigid with said boss for threadedly securing said cap nut to said body and surrounding said boss in spaced relation thereto for clamping said closure means in place with the end of said boss in bearing relation thereto; said boss having a plurality of unobstructed grooves recessed into the bottom face thereof and extending from the lower end of said space within said cap nut to a point beyond said packing between said boss and said skirt to form drainage passageways with said closure means for freely draining moisture and foreign matter entering said clearance space away from said stem, and said skirt having at least one opening therethrough for freely draining away the moisture and foreign matter entering the space between said skirt and said boss.

4. In a rotary plug valve assembly a body having a through passage for fluid flow and a plug bore intersecting said passage, a ported valve plug rotatably mounted in said bore and adapted to be turned about a vertical axis between positions where it blocks said passage or permits fluid flow through said valve assembly, an operating valve stem for rotating said plug and having a cylindrical portion projecting vertically upwardly through an open cylindrical bore in said valve body and beyond said body, an annular radial seal assembly surrounding said valve stem and including an axially compressible packing disposed in said cylindrical bore and a rigid annular washer abuttingly overlying said compressible packing, a cover removably secured to said body and having a non-rockable flat bottom face in solid engagement with a major portion of the upper surface of said rigid washer to seat and compress said compressible packing such that said compressible packing establishes a radial fluid tight seal between said cylindrical bore and said valve stem portion, said cover having an oversized aperture through which said valve stem freely projects such that a space is formed between said stem and said cover, and means providing for at least one drainage passage extending from the bottom of said space to a point exteriorly of and below said cover for draining said space of moisture and foreign matter accumulating therein, said drainage passage being arranged relative to said space and being of sufficient size to allow liquid entering said space to freely discharge through said drainage passage and thereby flush foreign objects downwardly and out of said space.

5. In a rotary plug valve assembly a body having a through passage for fluid flow and a plug bore intersecting said passage, a ported valve plug rotatably mounted in said bore and adapted to be turned about a vertical axis between positions where it blocks said passage or permits fluid flow through said valve assembly, an operating valve stem for rotating said plug and having a cylindrical portion projecting vertically upwardly through an open cylindrical bore in said valve body and beyond said body, an annular radial seal assembly surrounding said valve stem and including an axially compressible packing disposed in said cylindrical bore and a rigid annular washer abuttingly overlying said compressible packing, a cover removably secured to said body and having a non-rockable flat bottom face in solid engagement with a major portion of the upper surface of said rigid washer to seat and compress said compressible packing such that said compressible packing establishes a radial fluid tight seal between said cylindrical bore and said valve stem portion, said cover having an oversized aperture through which said valve stem freely projects such that a space is formed between said stem and said cover, and means providing for at least one drainage passage disposed at the interface between said washer and said cover and extending substantially radially from the bottom of said space to a point exteriorly of and below said cover for draining said space of moisture and foreign matter accumulating therein, said drainage passage being arranged relative to said space and being of sufficient size to allow liquid entering said space to freely discharge through said drainage passage and thereby flush foreign objects downwardly and out of said space.

6. The rotary plug valve assembly defined in claim 4, said cover having a skirt portion threadedly engaged with said body and said drainage passage being disposed at the interface between said washer and said cover, and means providing a further passage in said skirt portion communicating with said drainage passage and extending to the exterior of said skirt portion.

7. The rotary plug valve assembly defined in claim 5, said washer having a flat surface abutting said cover, said passage being formed by an unobstructed groove recessed into the bottom face of said cover to provide a radial channel with said washer.

References Cited in the file of this patent

UNITED STATES PATENTS

| | | |
|---|---|---|
| 470,971 | Bauer | Mar. 15, 1892 |
| 2,208,394 | Scherer | July 16, 1940 |

FOREIGN PATENTS

| | | |
|---|---|---|
| 7,014 | Great Britain | of 1892 |

UNITED STATES PATENT OFFICE
CERTIFICATE OF CORRECTION

Patent No. 3,030,067

April 17, 1962

Paul A. Manor

It is hereby certified that error appears in the above numbered patent requiring correction and that the said Letters Patent should read as corrected below.

Column 4, line 3, for "uniform" read -- uniformly --; line 25, for "conventric" read -- concentric --; column 6, line 11, for "last" read -- least --.

Signed and sealed this 6th day of November 1962.

(SEAL)
Attest:

ERNEST W. SWIDER
Attesting Officer

DAVID L. LADD
Commissioner of Patents